United States Patent

[11] 3,587,228

[72] Inventor Edward H. Clements
 Malvern, Ark.
[21] Appl. No. 866,901
[22] Filed Oct. 16, 1969
[45] Patented June 28, 1971
[73] Assignee Exline, Inc., Salina, Kans.

[54] AIR STARTER VALVE CONTROL SYSTEM FOR A MULTICYLINDER ENGINE
 12 Claims, 4 Drawing Figs.
[52] U.S. Cl. .................................................. 60/16,
 91/187, 91/262, 91/333, 123/179
[51] Int. Cl. ...................................................... F02n 9/04,
 F01b 27/00, F01b 29/04
[50] Field of Search .......................................... 123/179
 (F); 60/14 (B), 16, 16 (D), (Inquired); 91/187,
 262, 333, (Inquired)

[56] References Cited
 UNITED STATES PATENTS
| | | | |
|---|---|---|---|
| 1,114,334 | 10/1914 | Barnes .......................... | 123/90.18 |
| 1,157,849 | 10/1915 | Davison et al. ................ | 123/90.17 |
| 1,246,361 | 11/1917 | Unckles ........................ | 60/16(D) |
| 1,336,616 | 4/1920 | Christensen .................. | 60/16 |
| 1,401,747 | 12/1921 | Winton .......................... | 60/16(D) |
| 2,690,165 | 9/1954 | Harris et al. .................. | 91/187 |
| 3,019,596 | 2/1962 | Henninger .................... | 123/179(F)X |

Primary Examiner—Al Lawrence Smith
Attorney—Fishburn, Gold and Litman

ABSTRACT: An air starter valve control system for adjusting the timing of the introduction of starting air into cylinders of an engine to be started in coordination with the speed thereof wherein a power member is responsive to signals from a speed sensing device for adjusting the relative position of air valves and a cam rotated in response to rotation of the engine crankshaft. The air valves are arranged to control airflow passages that communicate a supply of starting air to the respective cylinders of the engine to be started when the cam holds the respective air valve in an open position. The power member is operative to change the relative position of the air valves and cam between a starting position having sufficient retard to allow initial rotation and a running position having sufficient advance to develop a proper starting speed and to return the air valves and cam to the starting position all in response to respective signals from the speed sensing device. The starting air closes all the air valves except the air valve held open by the cam and the air valves each have resilient members for positioning same to clear the cam when the supply of starting air is discontinued.

INVENTOR.
Edward H. Clements
BY
Fishburn, Gold & Litman
ATTORNEYS

AIR STARTER VALVE CONTROL SYSTEM FOR A MULTICYLINDER ENGINE

The present invention relates to timing of air distributors for injecting starting air into cylinders of engines to be started and more particularly to an apparatus for adjusting the timing of injecting the starting air in coordination with the speed of the engine for the optimum use of the starting air.

Heretofore, air distributors for timing the injection of high-pressure starting air into cylinders of engines to be started had a fixed timing. The fixed timing by necessity had to be at a compromise position between sufficient retard to allow initial rotation of the crankshaft and sufficient advance to develop a proper starting speed. Often the crankshaft stopped in such a position that rotation thereof could not be initiated without manually repositioning same, as by barring or jacking. Such a position would be when the piston has moved to adjacent dead center and the starting air must move the piston across dead center to rotate the crankshaft and the leverage at that position is minimal and at a great disadvantage. The efficiency of the prior air distributors were poor and allowed a wasteful consumption of high-pressure starting air.

The principal objects of the present invention are: to provide an air starter valve control system for adjusting the timing of injection of starting air into cylinders of an engine to be started in coordination with the engine speed which overcomes the disadvantages of prior air distributors; to provide such an air starter valve control system wherein initial timing is retarded to take advantage of optimum crank position for initial torque, such as when the crank throw is approximately 90° from the connecting rod; to provide such an air starter valve control system for remote starting of engines wherein "dead spots" are eliminated and manual positioning of the crankshaft is not required; to provide such an air starter valve control system wherein the timing can be advanced after the crankshaft begins to rotate whereby a minimum of starting air consumption results in a maximum turning speed; to provide such an air starter valve control system wherein wear occurs on distributor air valves and cam only during the starting period and the valves are positioned to clear the cam at all times when the supply of starting air is discontinued to the distributor; to provide such an air starter valve control system which repositions the distributor in the initial retard position after the engine is running at a selected speed to prepare for the next start; and to provide such an air starter valve control system which is economical to manufacture, positive in operation, sturdy and durable in construction, and particularly well adapted for the proposed use.

Other objects and advantages of this invention will become apparent from the following description taken in connection with the accompanying drawings wherein are set forth by way of illustration and example certain embodiments of this invention.

FIG. 3 is an enlarged elevational view of an air valve.

Figure 1:
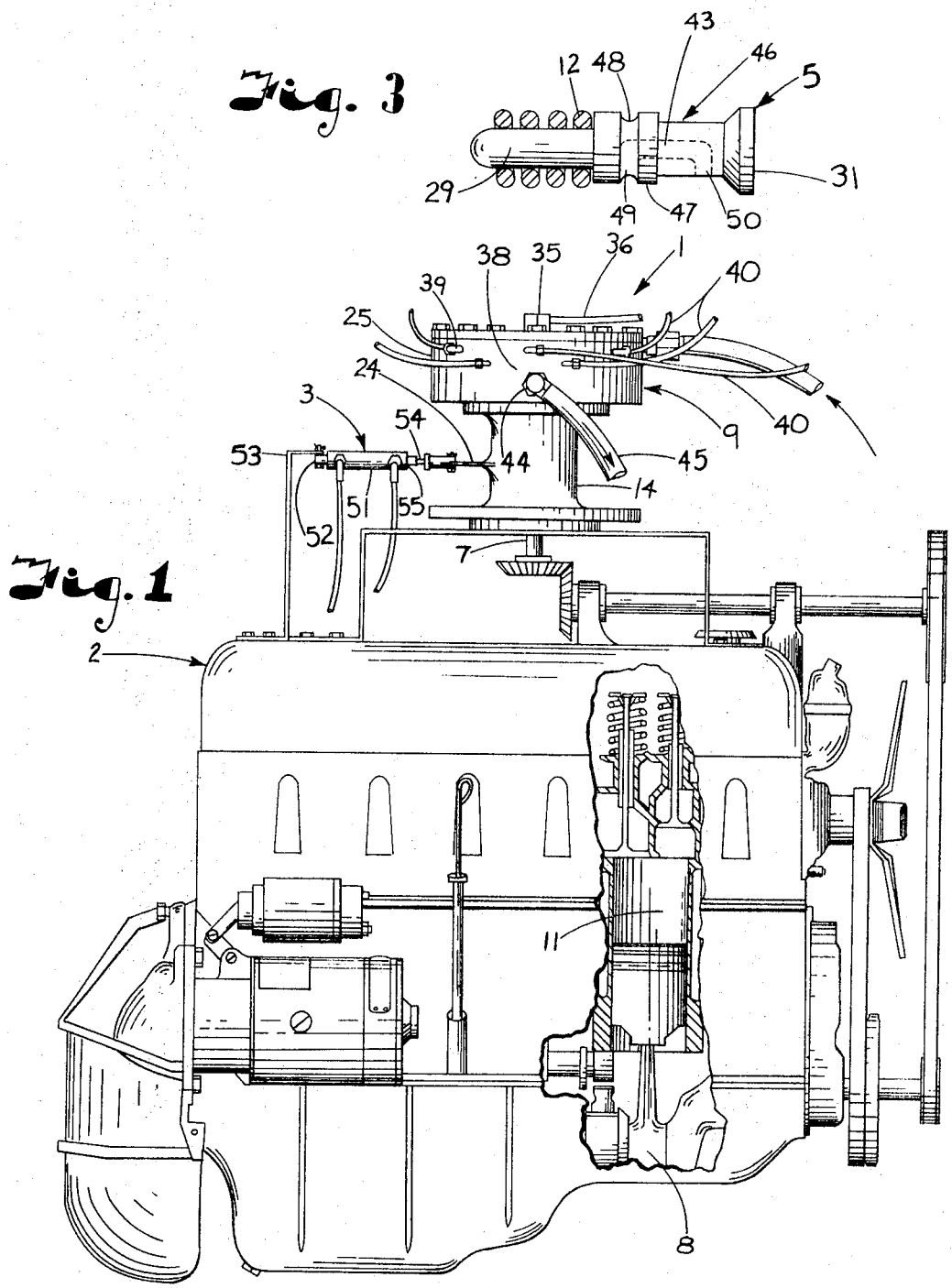
FIG. 1 is an elevational view of an air starter valve control apparatus embodying features of the present invention.
Figure 2:
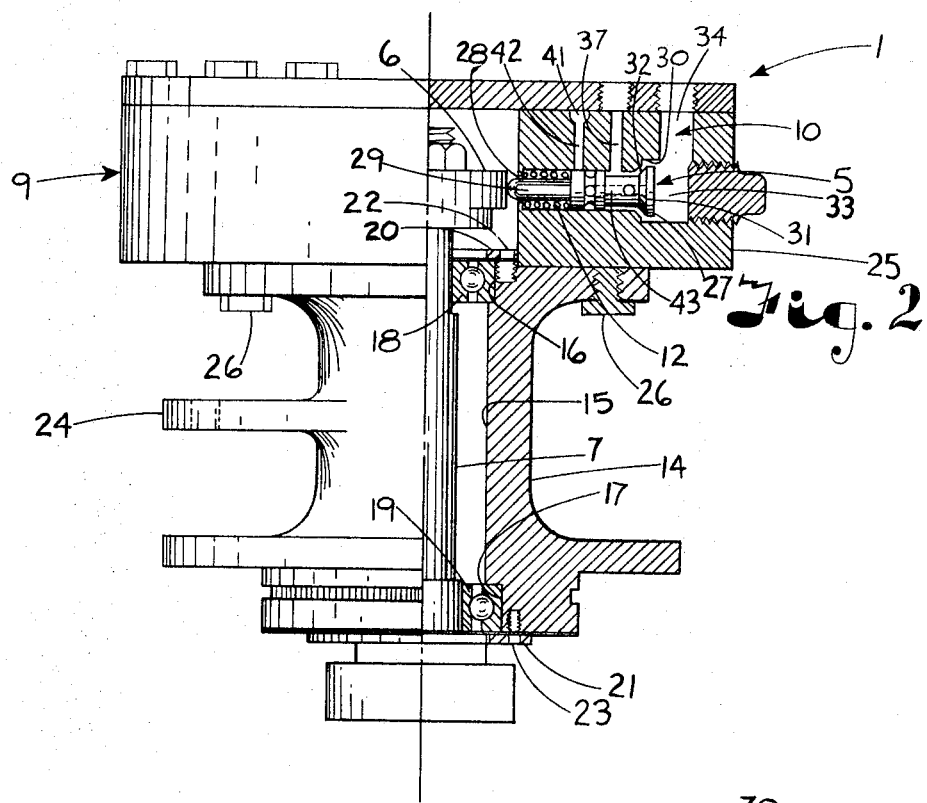
FIG. 2 is an enlarged elevational view of the air starter valve control apparatus with a portion shown in section to show the component parts thereof.
Figure 4:
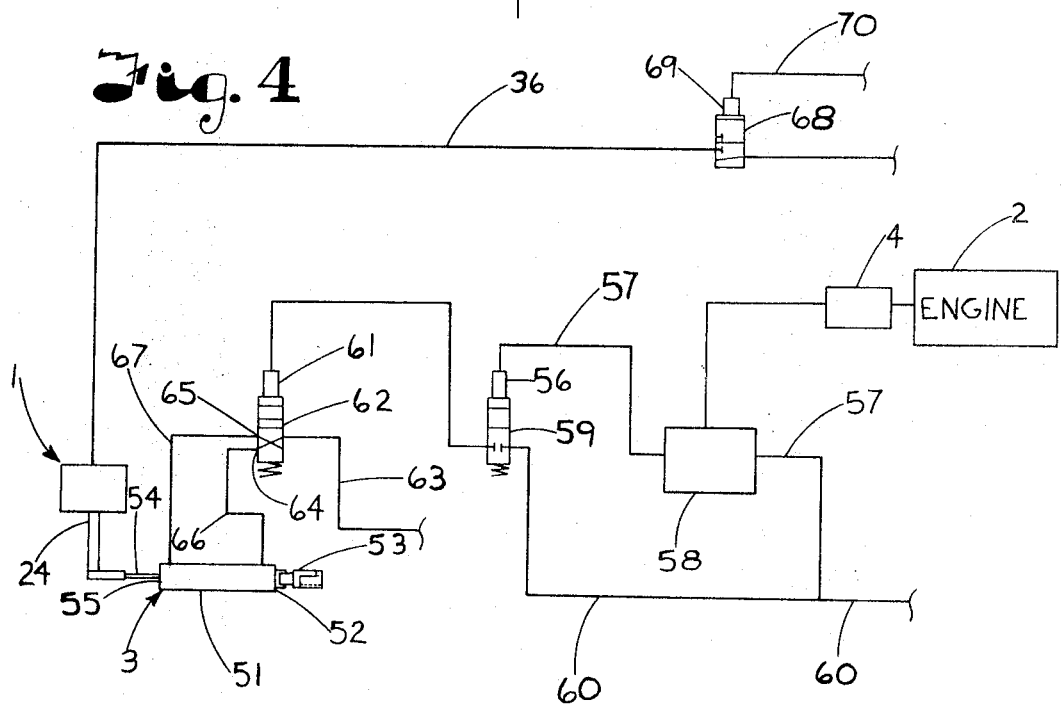
FIG. 4 is a schematic view of control means for adjusting the timing for injecting starting air into cylinders of an engine to be started, with the essential operating parts diagrammatically shown.

Referring more in detail to the drawings:

The reference numeral 1 generally designates an air distributor for introducing starting air into cylinders of an engine 2 to be started and adjusting the timing of the introduction of the starting air in coordination with the speed thereof. An extensible power member 3 is connected to the air distributor 1 and is responsive to signals from a speed sensing device 4 for adjusting the position of a plurality of air valves 5 relative to a cam 6 mounted on a camshaft 7. The camshaft 7 is driven or rotated by a crankshaft 8 of the engine 2, as by gears, chains, belts and the like (not shown), to turn the cam 6 relative to the air valves 5. The air valves 5 are mounted in a housing 9 having airflow passages 10, as later described, therethrough for communicating a supply of starting air to the cylinders 11 of the engine 2 to be started when the cam 6 holds the respective air valve 5 in an open position. The extensible power member 3 is operative to move the housing 9 and the air valves 5 therein between a starting position having sufficient retard to allow initial rotation of the crankshaft 8 and a running position having sufficient advance to develop a proper starting speed of the engine 2, and to return the housing 9 and the air valves 5 therein to the starting position, all in response to respective signals from the speed sensing device 4. The starting air communicates with the airflow passages 10 which are opened and closed by movement of the respective air valves 5 and the starting air moves the air valves 5 to close all the air passages 10 except the one having the air valve 5 therein held open by the cam 6 on the camshaft 7, as later described. The air valves 5 each have resilient members 12 for positioning same to clear the cam 6 when the supply of starting air is discontinued, thereby substantially reducing wear on the air valves 5 and the cam 6. The number of the air valves 5 is equal to the number of cylinders 11 of the engine 2 to be started and the flow passages 10 at each air valve 5 communicate with a respective cylinder 11 of the engine to be started.

The camshaft 7 is operatively connected to the crankshaft 8 of the engine 2 to be started, whereby rotation of the crankshaft 8 effects rotation of the camshaft 7 and the cam 6 thereon to open the air valves 5 in sequence to permit starting air under pressure to flow through the air passages 10 to a respective cylinder 11 of the engine 2 to be started. The cam 6 is positioned to hold open the respective air valve 5 associated with the respective cylinder 11 of the engine 2 to be started having the crankshaft 8 positioned to take advantage of a better crank position for initial torque to effect rotation thereof, such as when the crank throw is approximately 90° from the connecting rod thereof.

In the illustrated structure, the camshaft 7 is rotatably supported in the housing 9 which has a bearing portion 14 having a bore 15 extending therethrough. Counterbores 16 and 17 are formed at opposite ends of the bore 15 to receive suitable bearings, such as ball bearings 18 and 19 respectively which are in engagement with an intermediate portion of the camshaft 7 for rotatably supporting same. The bearings 18 and 19 are held in position within the counterbores 16 and 17 by bearing retainer rings 20 and 21 respectively which are suitably secured to opposite ends of the bearing portion 14 of the housing 9, as by a plurality of screws 22 and 23 respectively.

The airflow passages 10 and the air valves 5 therein are initially positioned in a starting position having sufficient retard to allow initial rotation of the crankshaft 8 and camshaft 7. After rotation is effected, consumption of high-pressure starting air is high and the efficiency of the air distributor is poor, therefore, it is desirable to reposition the air passages 10 and the air valves 5 therein to a running position having sufficient advance to develop a proper starting speed and to return the air passages 10 and air valves 5 therein to the starting position after the starting position has been effected, all in response to signals from the speed sensing device 4.

In the illustrated structure, an arm 24 extends outwardly from an intermediate portion of the bearing portion 14 of the housing 9 and has the extensible power member 3 connected thereto for adjusting the position of the air passages 10 and the air valves 5 therein by moving the housing 9 to adjust the timing of the introduction of starting air into the cylinders 11 of the engine 2 to be started in response to signals from the speed sensing device 4, as later described.

The housing 9 has a valve portion 25 having the airflow passages 10 and the air valves 5 reciprocably mounted therein and surrounding the cam 6 on the camshaft 7. The valve portion 25 of the housing 9 is suitably secured to the bearing portion 14, as by a plurality of circumferentially spaced screws 26, whereby operation of the extensible power member 3 moves the arm 24, thereby rotating the valve portion 25 to move the air passages 10 and air valves 5 relative to the cam 6 for adjusting the timing of the introduction of starting air into the cylinders of the engine 2 to be started.

The valve portion 25 has a plurality of valve bores 27 for receiving the air valves 5 for reciprocable movement therein. The valve bores 27 are spaced around the camshaft 7 and form a portion of the respective airflow passages 10. The air valves 5 are movable within the respective valve bores 27 to open and close the respective airflow passage 10. In the illustrated structure, the valve bores 27 are circumferentially spaced around the camshaft 7 and extend radially therefrom. Each valve bore 27 has a passage 28 at one end thereof in the form of a bore of reduced diameter for reciprocable movement of a rod portion 29 of the respective air valve 5 in response to engagement and release by the cam 6. Each valve bore 27 has a counterbore 30 at the other end thereof to define a space for opening and closing movement of a head portion 31 of the respective air valve 5.

A seat 32 is formed at the intersection of the bore 27 and counterbore 30 to be engaged by the head portion 31 of the respective air valve 5 to close the respective flow passage 10, as later described, through the valve portion 25 of the housing 9. Each air valve 5 thereby permits communicating a supply of starting air under pressure to the respective cylinders 11 of the engine 2 to be started when same is opened by the cam 6.

An inlet air supply chamber 33 is formed within the valve portion 25 of the housing 9 and the chamber 33 communicates with each of the counterbores 30. An inlet port 34 communicates the supply chamber 33 with a suitable source of high-pressure starting air, as by a fitting 35 mounted in the inlet port 34 and an elongate flexible tubular member 36 connected to a suitable air compressor (not shown).

An outlet port 37 extends between each valve bore 27 and an exterior surface 38 of the valve portion 25 of the housing 9 for communicating the starting air from the supply chamber 33 to the respective cylinder 11 of the engine 2 to be started, as by a fitting 39 and an elongate flexible tubular member 40.

The valve portion 25 of the housing 9 has an exhaust air chamber 41 therein and an exhaust air port 42 communicates each of the valve bores 27 with the exhaust air chamber 41. An exhaust air passage 43, as later described, extends through each of the air valves 5 to provide communication between the respective outlet port 37 and the respective exhaust air port 42 for exhausting air within the outlet port 37 after the respective air valve 5 has been closed in response to the supply of starting air within the inlet air supply chamber 33.

THe exhaust air chamber 41 communicates with the exterior surface 38 of the valve portion 25, thereby permitting the escape of the exhaust air from the chamber 41, as by a fitting 44 and an elongate flexible tubular member 45 for returning the exhaust air to a suitable air compressor (not shown).

Each air valve 5 has a body portion 46 having one end mounted on the rod portion 29. The head portion 31 of the respective air valve 5 is positioned at the other end of the body portion 46 and is enlarged relative to the remainder of the body portion 46. The head portion 31 is adapted to engage the seat 32 to close the respective valve bore 27 in response to pressure of the starting air within the inlet air supply chamber 33. An enlarged guide portion 47 is positioned at the one end of the body portion 46 and is sized to slidably engage interior surfaces of the valve bore 27.

The guide portion 47 has an annular recess 48 therein which is positioned to align with the respective exhaust air port 42 when the air valve 5 is in the closed position whereby the exhaust air passage 43 through the respective valve 5 communicates the exhaust air chamber 41 with the outlet port 37. The exhaust air passage 43 is illustrated as following a substantially U-shaped path having one arm 49 communicating with the recess 48 and the other arm 50 positioned to align with the outlet port 37 when the head portion 31 engages the seat 32 thereby closing the respective air passage 10.

THe extensible power member 3 has one end pivotally connected to the arm 24 of the valve portion 25 and the other end held at a fixed spacing from the housing 9 whereby extension and contraction thereof rotates the housing 9 relative to the camshaft 7 to change the timing of the introduction of the starting air into the cylinders 11 of the engine 2 to be started. In the illustrated structure, the extensible power member 3 has a fluid actuated cylinder 51 having one end 52 pivotally connected to a fixed support 53. A piston (not shown) is reciprocably mounted within the cylinder 51 and has a piston rod 54 extending through the other end 55 of the cylinder 51. The free end of the piston rod 54 is pivotally connected to the arm 24 whereby when the piston rod 54 is in an extended position, the housing 9 and the air valves 5 therein will be positioned in a starting position and when the piston rod 54 is retracted, the housing 9 and the air valves 5 therein will be in a running position.

It is desirable to position the housing 9 and the air valves 5 therein in a retarded starting position to take advantage of a better crank position for initial torque, such as when the crank throw is approximately 90° from the connecting rod, and to reposition the housing 9 and air valves 5 therein in an advanced running position after the crankshaft 8 begins to rotate, thereby consuming a minimum quantity of starting air to develop a maximum shaft running speed, and to return the housing 9 and the air valves 5 therein to the initial retarded starting position after the engine is running at a selected speed, to thereby prepare for the next start. Control means for controlling the supply of fluid to the cylinder 51 in response to signals from the speed sensing device 4 is operative to move the piston rod 54 between the extended and retracted positions thereof.

In the illustrated structure, suitable energizing fluid, for example, air under pressure, communicates with a cylinder 56 by means of a suitable conduit 57. Flow of the energizing fluid to the cylinder 56 is controlled by a suitable valve or relay 58 mounted in the conduit 57 and the valve or relay 58 is operatively connected to the speed sensing device 4 whereby signals therefrom are operative to cause the relay or valve 58 to open to permit flow of the energizing fluid to the cylinder 56 and to close the valve or relay 58 to interrupt the flow of the energizing fluid to the cylinder 56. The cylinder 56 is operatively connected to a normally closed control valve 59. The energizing fluid communicates with the control valve 59 through a conduit 60 which is connected to the conduit 57. When the relay or valve 58 is energized by a signal from the speed sensing device 4, the energizing fluid flows to the cylinder 56, thereby positioning the normally closed control valve 59 in an open position to permit the energizing fluid to flow to an activating cylinder 61, as later described, for positioning a control valve 62 for controlling the flow of a suitable activating fluid, such as air under pressure, to the cylinder 51 of the extensible power member 3.

The activating fluid is delivered to the control valve 62 through a conduit 63 and the control valve 62 has a normally open port 64 and a normally closed port 65. The normal position of the control valve 62 is such that the activating fluid is operative to position the piston rod 54 in the extended position thereby positioning the flow passages 10 and air valves 5 in the starting position. In the illustrated structure, when the supply or energizing fluid is interrupted by the valve or relay 58 and the control valve 59, the activating fluid flows through the control valve 62, through the normally open port 64, and through a conduit 66 to the one end 52 of the cylinder 51 to position the piston within the cylinder 51 and the piston rod 54 in the extended position, thereby moving the arm 24 and the housing 9 to the retard or start position.

After the crankshaft 8 obtains a suitable selected turning speed, the relay or valve 58 is energized by a signal from the speed sensing device 4 to permit the energizing fluid to flow through the control valve 59 and activate the cylinder 61 to permit the activating fluid to communicate with the normally closed port 65 and through a conduit 67 to the other end 55 of the cylinder 51. When the activating fluid communicates with the other end 55 of the cylinder 51, the piston therein is moved to move the piston rod 54 to the retracted position, thereby rotating the housing 9 and the passages 10 and valves 5 therein relative to the camshaft 7 to a position wherein the timing is advanced, so that a minimum of starting air consumption results in maximum turning speed of the crankshaft 8. After the engine obtains a proper turning speed, a signal from the speed sensing device 4 is communicated to the relay or valve 58 thereby repositioning the control valve 59 in the normally closed position, which interrupts the flow of the energizing fluid to the cylinder 61 and results in the control valve 62 assuming its original position, whereby the activating fluid communicates with the one end 52 of the cylinder 51 to move the piston rod 54 to the extended position and the housing 9 and air valves 5 therein to the starting position in preparation for the next start.

A control valve 68 is mounted in the tubular member 36 and is operated by an air cylinder 69 mounted on the control valve 68. A suitable signal, such as air under pressure through a conduit 70, is operative to energize the air cylinder 69 to open the control valve 68 to permit starting air to flow therethrough and to the inlet air supply chamber 33. The speed sensing device 4 is also operative to interrupt the signal to the air cylinder 69 when the engine 2 to be started has obtained a proper turning or running speed to thereby discontinue or interrupt the flow of starting air to the air distributor 1. When the starting air supply is discontinued the resilient members 12 move the respective air valves 5 out of engagement with the seat 32 and move the rod portions 29 thereof to a position to clear the cam 6, all substantially simultaneously with the repositioning of the housing 9 and air valves 5 therein in the original starting position.

Prior to starting operations of the air distributor 1, the resilient members 12 hold the air valves 5 in an open position having the head portion 31 thereof out of engagement with the respective seat 32 and having the free end of the rod portions 29 positioned to clear the cam 6. A signal is conveyed to the air cylinder 69 to operate the control valve 68 to permit the starting air under pressure to flow therethrough and into the inlet air supply chamber 33 within the valve portion 25 of the housing 9. The air pressure therein overcomes the resistance of the resilient members 12 and closes or seats all of the air valves 5, except the air valve having the rod portion 19 thereof in engagement with the cam 6. The starting air flows around the body portion 46 of the respective air valve 5 held open by the cam 6 and the starting air flows into the outlet port 37 which communicates with the respective cylinder 11 of the engine 2 to be started, thereby initiating rotation of the crankshaft 8. As the crankshaft 8 turns, the camshaft 7 is also turned to engage the cam 6 with the rod portion 29 of the next adjacent air valve 5. Turning of the cam 6 permits the first air valve 5 held open thereby to close in response to the pressure from the starting air, and starting air trapped in the respective outlet port 37 and flexible tubular member 40 escapes through the exhaust air passage 43 in the respective air valve 5 and through the exhaust air port 42 to the exhaust air chamber 41. After the crankshaft 8 obtains a selected speed, the speed sensing device 4 signals the relay or valve 58 to open the control valve 59 to permit the energizing fluid to activate the cylinder 61, thereby moving the piston rod 54 to the retracted position. The starting air continues to flow around the respective air valves 5 to increase the running speed of the engine until a proper running speed is obtained and then the speed sensing device 4 signals the relay or valve 58 to close the control valve 59 whereby the piston rod 54 returns to an extended position. Substantially simultaneously with the last-named signal, the supply of starting air is interrupted by operation of the air cylinder 69 and control valve 68 whereby the resilient members 12 position the rod portion 29 of the respective air valves 5 to clear the cam 6 during the running of the engine. The cam 6 does not engage the end of the rod portions 29 until starting air is reintroduced into the supply chamber 33 for the next start.

It is to be understood that while I have illustrated and described one form of my invention, it is not to be limited to this specific form or arrangement of parts herein described and shown.

What I claim and desire to secure by Letters Patent is:

I claim:

1. An air starter valve control system for a multicylinder engine comprising:
   a. an engine driven camshaft having a cam thereon;
   b. a housing surrounding said camshaft and mounted for movement relative to said cam;
   c. a plurality of air valves disposed in said housing equal in number to the number of cylinders in an engine to be started, said valves each having a portion thereof engageable by said cam for opening said respective valve;
   d. flow passages at each of said air valves for communicating a supply of starting air to the respective cylinders to the engine to be started;
   e. power means for moving said housing and thereby adjusting the position of the air valves relative to said cam; and
   f. engine speed sensing means operatively connected to said power means for controlling the operation thereof, whereby the timing of the introduction of starting air into the cylinders of the engine to be started may be coordinated with the speed thereof.

2. The air starter valve control system as set forth in claim 1 wherein:
   a. said air valves each have resilient means for positioning same to clear said cam when the supply of starting air has been discontinued.

3. The air starter valve control system as set forth in claim 1 wherein:
   a. said cam is positioned adjacent one end of said camshaft;
   b. said camshaft has a plurality of longitudinally spaced bearings mounted on an intermediate portion thereof;
   c. said air valves are reciprocably mounted in said housing and are circumferentially spaced around said camshaft; and
   d. said housing is mounted on said bearings for rotary movement of said air valves relative to said cam.

4. The air starter valve control system as set forth in claim 3 wherein:
   a. said flow passages extend through said housing; and
   b. said power means is operatively connected to said housing whereby rotative movement thereof moves the air valves and air passages circumferentially relative to said cam to adjust the timing of the air valves.

5. The air starter valve control system as set forth in claim 4 wherein said power means includes:
   a. an extensible member having one end connected to said housing and the other end held at a fixed spacing from said housing;
   b. a source of fluid under pressure communicating with said extensible member; and
   c. control means for controlling the supply of fluid to said extensible member in response to signals from said engine speed sensing means.

6. The air starter valve control system as set forth in claim 5 wherein said control means includes:
   a. a control valve normally allowing activating fluid to flow to said extensible member to effect positioning of said housing and air valves therein in a starting position; and
   b. a fluid cylinder operatively connected to said control valve for operating same in response to a signal from said engine speed sensing means to allow the activating fluid to flow to said extensible member to effect repositioning of said housing and air valves therein in a running position.

7. THe air starting valve control system as set forth in claim 6 including:
   a. a source of energizing fluid under pressure connected to said fluid cylinder;
   b. a normally closed control valve for interrupting the flow of energizing fluid to said fluid cylinder; and c. a second fluid cylinder operatively connected to said normally closed control valve for opening same in response to a signal from said engine speed sensing means to allow the energizing fluid to flow therethrough to said first-named fluid cylinder to effect operation of said first-named control valve.

8. The air starting valve control system as set forth in claim 7 wherein:
   a. said energizing fluid is air under pressure;
   b. said activating fluid is air under pressure;
   c. said extensible member is a cylinder having a piston rod movable between an extended position wherein said housing is in said starting position and a retracted position wherein said housing is in said running position.

9. The air starter valve control system as set forth in claim 4 wherein:
   a. said flow passages include an inlet air supply chamber within said housing;
   b. said air valves each extend into said inlet air supply chamber whereby all of said air valves, except the air valve engaged by said cam, are urged toward a closed position;
   c. said inlet air chamber communicates with an outlet port at each of said air valves when said valves are open, said outlet ports each communicate with a respective cylinder of the engine to be started; and
   d. said air valves are each reciprocable within respective valve bores in said housing.

10. The air starter valve control system as set forth in claim 9 wherein:
    a. said housing has an exhaust chamber therein communicating with each of said valve bores; and
    b. said air valves each have an exhaust air passage therethrough communicating said respective outlet port and said exhaust chamber for exhausting air within said outlet port after said respective air valve closes in response to the supply of starting air under pressure.

11. The air starter valve control system as set forth in claim 10 wherein said air valves each include:
    a. an elongate body portion;
    b. an elongate rod extending from said body portion and having a free end thereof engageable by said cam;
    c. an enlarged head portion at one end of said body portion, said head portion being shaped to close said respective valve bore in response to pressure of starting air within said inlet air supply chamber; and
    d. an enlarged guide portion at the other end of said body portion, said guide portion having an annular recess therein for communicating said exhaust chamber with said exhaust air passage when said respective air valve is closed.

12. The air starter valve control system as set forth in claim 10 wherein:
    a. said valve bores each have a shoulder adjacent one end thereof; and
    b. an elongate resilient member is sleeved on said valve rod extending from the body portion thereof and has one end engaging said body portion for urging said respective air valve to an open position having said rod free end positioned to clear said cam.